May 29, 1923.
J. MUCHKA
1,456,820
CONVEYANCE OF HIGHLY INFLAMMABLE LIQUIDS
Filed Jan. 6, 1921
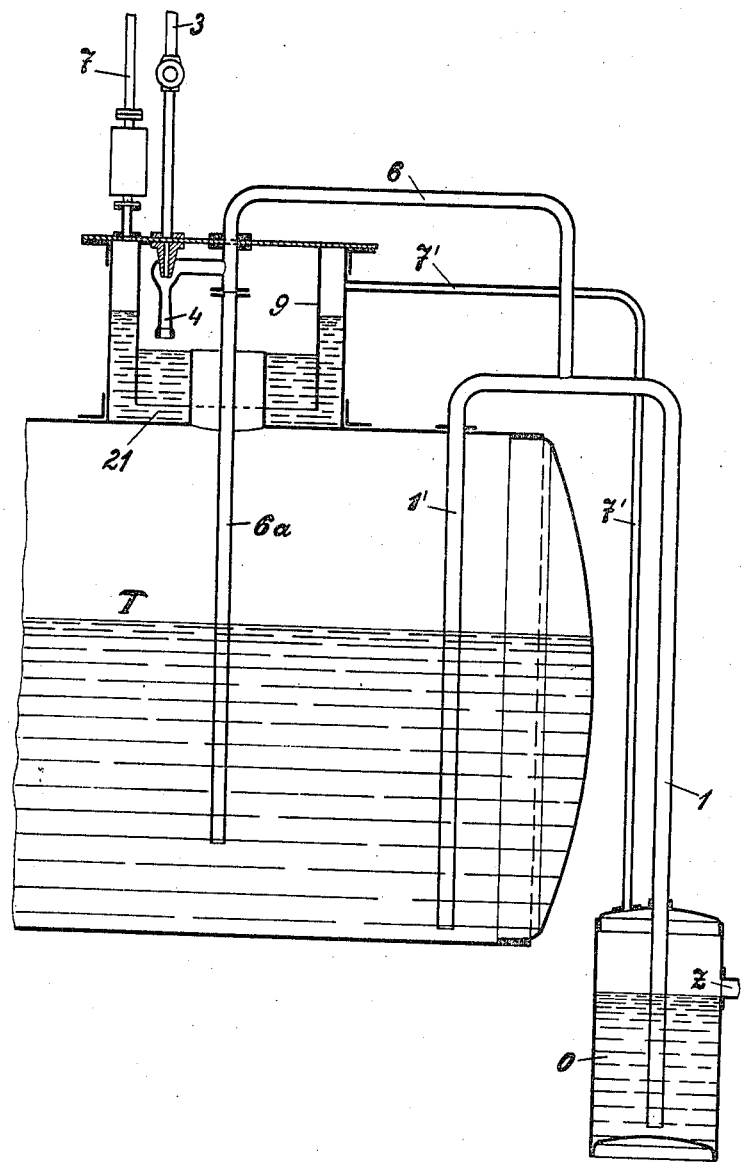
Inventor
J. Muchka,
By Marks & Clerk
Attys.

Patented May 29, 1923.

UNITED STATES PATENT OFFICE.

JOSEF MUCHKA, OF VIENNA, AUSTRIA.

CONVEYANCE OF HIGHLY-INFLAMMABLE LIQUIDS.

Application filed January 6, 1921. Serial No. 435,555.

*To all whom it may concern:*

Be it known that I, JOSEF MUCHKA, a citizen of the Republic of Austria, residing at Vienna, Austria, have invented certain new and useful Improvements in and Relating to the Conveyance of Highly - Inflammable Liquids, of which the following is a specification.

The present invention relates to a method of conveying highly inflammable liquids from storage vessels in which the liquid is stored under protective gas, and from which it is drawn off in fractional quantities into one or more tapping vessels by means of a siphon pipe.

The present method consists in starting the siphon action by means of a jet pump which delivers into the storage vessel and interrupting it by stopping the jet pump, for which a protective gas of the same kind as the protective gas stored above the liquid in the storage vessel is employed as driving medium.

The apparatus according to the present invention differs from the previously proposed apparatus in which the storage vessel and the tapping vessel are connected by a siphon, in that the siphon is connected to the suction-pipe of a jet pump by means of a pipe which opens into the siphon at the bend and passes down inside the storage vessel almost to the bottom thereof, the said pump delivering into the storage vessel.

One mode of carrying out the invention is illustrated diagrammatically in the accompanying drawing.

Referring to the drawing, the storage vessel T is connected to a tapping vessel O by means of a siphon pipe 1, 1¹, one limb 1¹ of which extends down to within the bottom of the storage vessel T. At the bend of the siphon-pipe 1, 1¹, a pipe 6, 6ª is connected up, which passes into the storage vessel T and terminates at a certain distance from the bottom of the storage vessel. The pipe 6, 6ª communicates with the suction-pipe of a jet pump 4 to which the driving medium, which is a protective gas of the same kind as that present in the storage vessel T, is supplied by means of a pipe 3. The jet pump 4 is arranged inside a dome or chamber mounted on the storage vessel, the said chamber being isolated by means of a liquid seal 21 from a pipe 7 leading to the outside air. The purpose of the liquid seal 21 is to enable a desired pressure difference between the storage vessel and the outside to be maintained.

The tapping pipe Z which issues from the tapping vessel O and which can also act as filling pipe, is placed at such a height from the bottom of the tapping vessel that a sufficient quantity of liquid will always remain behind in the tapping vessel O as is necessary to fill the limb 1 of the siphon, which dips into the liquid, up to the bend of the siphon. Communication is established between the tapping vessel O and the space 9 and by this means with the pipe 7 leading to the outside.

The mode of operation of the apparatus is as follows:—

The storage vessel is filled with the highly inflammable liquid by means of a pump (not shown in the drawing), the delivery pipe of the said pump being connected up to the tapping pipe Z of the tapping vessel O. When the pump forces liquid through the pipe Z into the tapping vessel O, the liquid passes through the siphon pipe 1, 1¹ into the storage vessel T which is filled with protective gas. The protective gas forced thereby out of the storage vessel passes out therefrom over the liquid seal 21 and the pipe 7.

For the purpose of tapping off the liquid, the jet pump 4 is put into operation by opening the pipe 3 to admit protective gas at a suitable pressure. By the suction action of the jet pump the liquid is drawn through the pipe 6ª and by way of the pipe 6 through the siphon limb 1¹ out of the storage vessel T and through the limb 1 out of the tapping vessel O. The columns of liquid which are drawn through the siphon limbs 1 and 1¹ meet in the bend of the siphon pipe at the point of junction with the pipe 6 thereby initiating the transfer of liquid from the storage vessel over the siphon pipe 1, 1¹ into the tapping vessel O and through the tapping pipe Z to the point of removal. The quantity of liquid conveyed through the pipe 6ª renews the liquid seal 21, from which the surplus liquid falls back into the storage vessel.

The siphon action in the pipe 1, 1¹ commences as soon as the jet pump 4 is capable of maintaining a vacuum in the pipe 6 which will correspond to the weight of the column of liquid in the siphon limb 1.

The tapping process is stopped when the supply of protective gas from the gas supply pipe 3 is shut off. The siphon thread then breaks down and the liquid falls back through the two limbs 1 and 1¹, on the one hand into the tapping vessel O and on the other hand into the storage vessel. The auxiliary pipe 6ª also empties itself so that when the apparatus is not in operation all the pipes are emptied and filled with protective gas.

The connection between the tapping pipe Z and the siphon pipe 1, 1¹ is interrupted by the gas space of the tapping vessel O which communicates by means of the pipe 7¹ with the space 9 and by means of the pipe 7 with the atmosphere.

The siphon process is interrupted by means of the auxiliary pipe 6ª when the liquid in the storage vessel reaches a certain level, by gas or air entering the highest point of the siphon pipe 1, 1¹ and breaking down the siphon thread when the mouth of the pipe 6ª is uncovered.

It will be obvious that in an apparatus of the kind described, the highest point of the pipe 6 lies always above the bend of the siphon.

What I claim is:—

1. Apparatus for drawing off highly inflammable liquids from a storage vessel in which the liquid is stored under protective gas, comprising in combination with a tapping vessel and a siphon for drawing off the liquid from the storage vessel into the tapping vessel, a jet pump for starting and stopping the action of the siphon, and capable of being operated by means of a protective gas of the same kind as that contained in the storage vessel above the liquid.

2. Apparatus for drawing off highly inflammable liquid from a storage vessel in which the liquid is stored under protective gas, comprising in combination with a tapping vessel and a siphon for drawing off the liquid from the storage vessel into the tapping vessel, a jet pump for starting and stopping the action of the siphon, and capable of being operated by means of a protective gas of the same kind as that contained in the storage vessel above the liquid and a pipe connecting the siphon to the suction side of the jet pump, the said pipe opening into the siphon at the bend and passing down into the storage vessel almost to the bottom thereof.

3. Apparatus for drawing off highly inflammable liquid from a storage vessel in which the liquid is stored under protective gas, comprising in combination with a tapping vessel and a siphon for drawing off the liquid from the storage vessel into the tapping vessel, a jet pump in open communication with the gas space of the storage vessel and for starting and stopping the action of the siphon, and capable of being operated by means of a protective gas of the same kind as that contained in the storage vessel above the liquid, a pipe connecting the siphon to the suction side of the jet pump, the said pipe opening into the siphon at the bend and passing down into the storage vessel almost to the bottom thereof, a pipe leading to the outside air provided on the storage vessel and a liquid seal isolating the gas space of the storage vessel from the latter pipe, the jet pump also serving for supplying liquid to the liquid seal.

4. Apparatus for drawing off highly inflammable liquids from a storage vessel in which the liquid is stored under protective gas, comprising in combination with a tapping vessel and a siphon for drawing off the liquid from the storage vessel into the tapping vessel, a jet pump for starting and stopping the action of the siphon, and capable of being operated by means of a protective gas of the same kind as that contained in the storage vessel above the liquid, a pipe connecting the siphon to the suction side of the jet pump, the said pipe opening into the siphon at the bend and passing down into the storage vessel almost to the bottom thereof, a tapping pipe provided on the tapping vessel, the capacity of the tapping vessel below the tapping pipe being equal to that of the siphon limb which passes into the tapping vessel.

5. Apparatus for drawing off highly inflammable liquid from a storage vessel in which the liquid is stored under protective gas, comprising in combination with a tapping vessel and a siphon for drawing off the liquid from the storage vessel into the tapping vessel, a jet pump in open communication with the gas space of the storage vessel and for starting and stopping the action of the siphon, and capable of being operated by means of a protective gas of the same kind as that contained in the storage vessel above the liquid, a pipe connecting the siphon to the suction side of the jet pump, the said pipe opening into the siphon at the bend and passing down into the storage vessel almost to the bottom thereof, a pipe leading to the outside air provided on the storage vessel, a liquid seal isolating the gas space of the storage vessel from the latter pipe, the jet pump also serving for supplying liquid to the liquid seal and a pipe connecting the gas space of the tapping vessel with the said pipe leading to the open air.

In testimony whereof I have affixed my signature in presence of two witnesses.

JOSEF MUCHKA.

Witnesses:
JUGO KEIK,
CARL CONDINLINY.